United States Patent [19]
Rector

[11] Patent Number: 5,425,876
[45] Date of Patent: Jun. 20, 1995

[54] GRAVITY SCREEN FILTER WITH DYNAMIC BACKWASH

[75] Inventor: John L. Rector, Woodlake, Calif.

[73] Assignee: Claude Laval Corporation, Fresno, Calif.

[21] Appl. No.: 142,665

[22] Filed: Oct. 25, 1993

[51] Int. Cl.⁶ .................... B01D 29/68; B01D 29/92
[52] U.S. Cl. .................... 210/354; 210/355; 210/411; 210/413; 210/456; 210/333.01; 209/308
[58] Field of Search .............. 210/411, 412, 408, 415, 210/354, 355, 413, 456, 333.01; 209/380

[56] References Cited

U.S. PATENT DOCUMENTS

| | | |
|---|---|---|
| 558,328 | 4/1896 | Upton . |
| 1,919,201 | 7/1933 | Clements . |
| 2,751,079 | 6/1956 | Ahlmann . |
| 2,874,840 | 2/1959 | Simpson . |
| 3,112,263 | 11/1963 | Ellila . |
| 3,357,567 | 12/1967 | Wake . |
| 3,460,383 | 2/1969 | Wantling . |
| 3,477,571 | 11/1969 | Maag . |
| 3,477,572 | 11/1969 | McKibben . |
| 4,214,988 | 7/1980 | Naffziger . |
| 4,271,018 | 6/1981 | Drori . |
| 4,412,920 | 11/1983 | Bolton . |
| 4,431,541 | 2/1984 | Lee . |
| 4,614,581 | 9/1986 | Drori . |
| 4,661,253 | 4/1987 | Williams . |
| 5,228,993 | 7/1993 | Drori . |
| 5,259,955 | 11/1993 | Bolton . |

FOREIGN PATENT DOCUMENTS

| | | |
|---|---|---|
| 567208 | 10/1993 | European Pat. Off. . |
| 2351717 | 1/1978 | France . |
| 2446746 | 4/1975 | Germany . |
| 60-156521 | 8/1985 | Japan . |
| 4-363182 | 12/1992 | Japan . |
| 2237521 | 5/1991 | United Kingdom . |
| 2256599 | 12/1992 | United Kingdom . |
| 297404 | 4/1971 | U.S.S.R. . |
| 956052 | 9/1982 | U.S.S.R. . |
| 1554990 | 4/1990 | U.S.S.R. . |
| 85/4340 | 10/1985 | WIPO . |
| 91/12870 | 9/1991 | WIPO . |

Primary Examiner—Thomas M. Lithgow
Attorney, Agent, or Firm—Donald D. Mon

[57] ABSTRACT

A self-cleaning gravity screen for removing particulate material from a liquid stream. The screen slopes, and beneath it a rotary wand sweeps against its lower side to keep the screen perforations open and assist movement of retained solids along the screen. The wand is driven by a rotary water wheel.

6 Claims, 1 Drawing Sheet

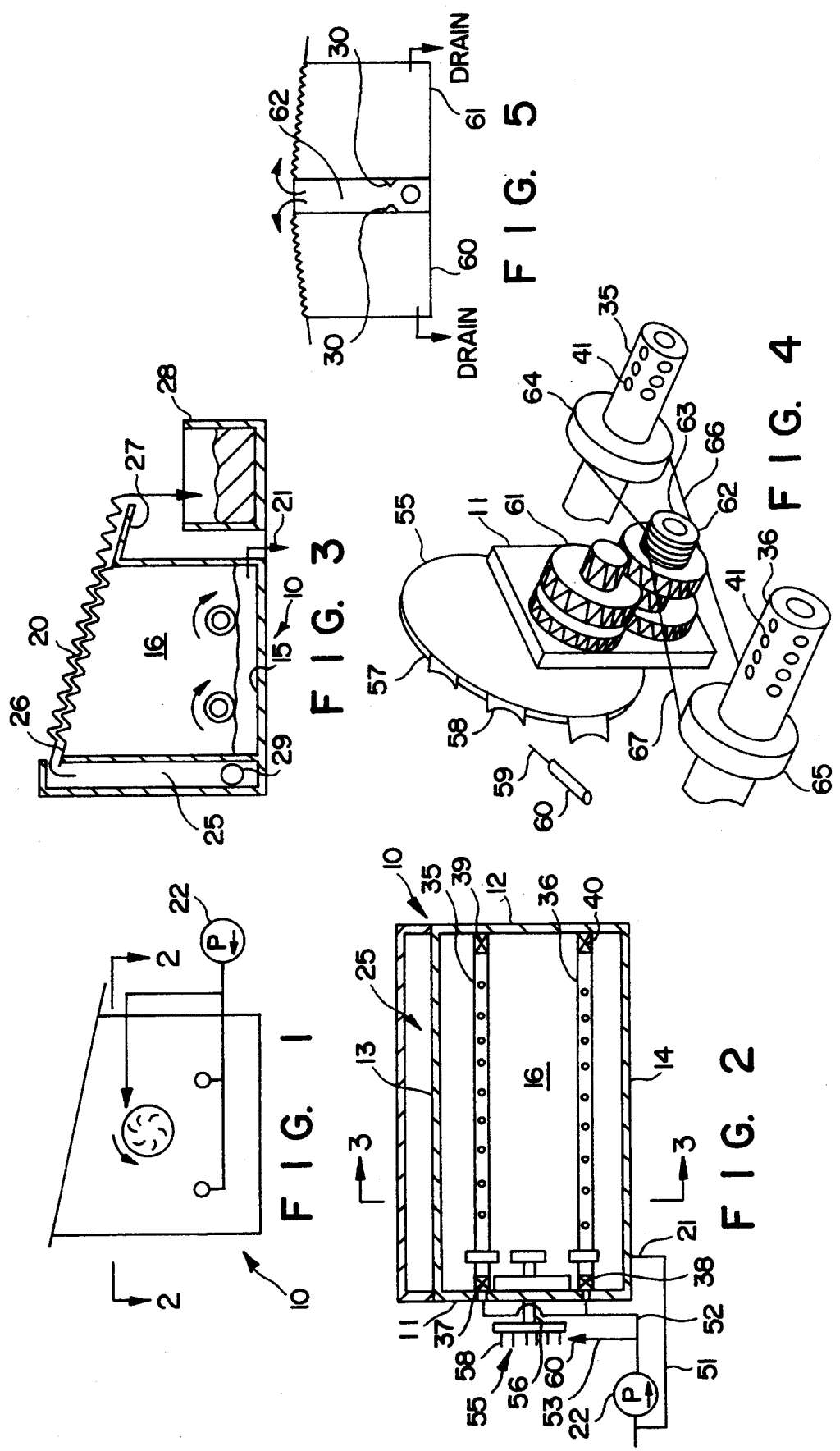

GRAVITY SCREEN FILTER WITH DYNAMIC BACKWASH

FIELD OF THE INVENTION

This invention relates to filters having self-cleaning gravity screens that utilize a dynamic backwash to keep the screen perforations open and to facilitate passage of retained material along the screen, and in particular to an improved drive system for the backwash.

BACKGROUND OF THE INVENTION

Gravity screens are widely used to separate solids from streams of water in order to produce an effluent useful for purposes such as irrigation or acceptability to a sewer, or as a first step in processing solid-laden streams ultimately to produce potable water.

A well-known example of gravity screen systems is shown in Wake U.S. Pat. No. 3,357,567. This patent is incorporated by reference herein its entirety for its showing of systems of this type, and of their utility.

For example, water in irrigation ditches generally is burdened with considerable organic trash and mineral particulates. It is undesirable to dump this material into a crop-growing area. Directing it first through a system according to this invention can clarify the stream to the extent that when applied to crops it is without this burden, and acceptable to crop land.

In addition to agricultural applications, this invention finds utility in many industrial applications where a water stream is used in processes involved in manufacturing or food preparation operations. Washings from vegetables and fruits, and even washings from floors, generate debris-laden streams that require removal of solids before the water can be used again, or before it can be discharged into a sewer.

This invention utilizes a rotating wand below the screen which, as it rotates around a horizontal axis, projects streams of water upwardly against the screen. Rotation of the rotary wand causes the emitted water streams to move along the screen so as to assist movement of the debris along the screen, as well as to prevent the screen perforations from becoming clogged.

The foregoing is known art, but it has suffered from a lack of reliable power for rotating the wand. One problem resides in the very slow rotation desired for the wands—on the order of 2 rpm. When sprinkler motors or electric motors are used, problems soon develop because their power and their output do not match the system requirements.

Because this device relates entirely to water systems, and a source of clean-enough water is available from the filter, a pump can be utilized to project a stream of water through a nozzle to a water wheel that can turn at a rapid rate which is greatly reduced by a gear reduction to drive the wand. This provides a powerful drive without a mechanical linkage to an electric motor. If for some reason the wands are stalled, no harm is done to the water wheel. In that unlikely event, it simply stalls and the pump continues to run without unfavorable consequences. The pump supplies water both for backwashing and for powering the wands, and ordinarily utilizes water which has already passed through the screen.

Accordingly it is an object of this invention to provide a compact system which downstream from a pump is entirely hydraulically actuated, and in which hose connections can be appreciably shortened and in many applications eliminated entirely.

BRIEF DESCRIPTION OF THE INVENTION

A filter system according to this invention utilizes a perforated screen having an upper and a lower surface with perforations which extend between them. A water-collection chamber is disposed beneath the screen. Supply means discharges a stream with material to be separated onto the upper surface. A rotary wand underneath the screen has an axis of rotation parallel to said lower surface. It has a plurality of laterally-directed nozzles which discharge water from the wand. When directed toward the screen, the nozzle streams impinge upwardly against the lower surface, and move along it. This tends to keep the perforations open, and also tends to move retained solids along the upper surface of the screen toward a debris collection chamber.

According to a feature of this invention, pump means draws previously filtered water from the water collection chamber, pressurizes it, and discharges it through a nozzle onto a water wheel. The force of the stream is exerted against blades on the wheel, and the wheel is turned. A gear reduction means is turned by the wheel, which in turn drives the wands. The wands are also connected to the pump discharge so that previously filtered water is discharged by the wands. Thus the water collection chamber contains only filtered water, some which has passed through the screen and some of which is recycled to it through the wands. Water from the water collection chamber is withdrawn for further use or discharge.

According to a preferred but optional feature of this invention, a plurality of wands are provided which are journaled to a supporting wall. They are driven by a belt system which in turn is powered by the gear reduction means.

According to yet another preferred but optional feature of the invention, the filter system can be provided in modules which can be assembled side by side, conveniently to increase the through put capacity.

The above and other features of this invention will be fully understood from the following detailed description and the accompanying drawings, in which:

BRIEF DESCRIPTION OF THE DRAWINGS

FIG. 1 is a schematic end view of a module of the invention;

FIG. 2 is a cross-section, partly in schematic notation, taken at line 2—2 in FIG. 1;

FIG. 3 is a cross-section, partly in schematic notation, taken at line 3—3 in FIG. 2;

FIG. 4 is an oblique partial view, partly in schematic notation, showing the preferred embodiment of drive means; and FIG. 5 is a fragmentary perspective view, partly in cutaway cross-section, showing two modules assembled to increase the flow-put capacity.

DETAILED DESCRIPTION OF THE INVENTION

A module 10 for a screen filter system is shown in FIG. 1. A pair of end walls 11, 12 and a pair of side walls 13, 14 and a bottom 15 form a water collection chamber 16.

A perforated screen 20 is laid atop the water collection chamber. It has a suitable slope, preferably about 5° to the horizontal. A drain port 21 drains water which has passed through the screen from the water collection chamber. This water is directed to any desired location, including to a pump 22 for powering the wands.

An inlet chamber 25 is formed along and spaced from side wall 13. It is formed as a well adjacent to side wall 13 and rises above its upper edge so that a water stream with a burden to be separated flows gently over the upper edge 26 of the side wall and onto the screen. This material flows downwardly over the screen. The water drains through the screen, and the burden is moved along toward side wall 14 by gravity, with the assistance of water streams to be disclosed below.

An apron 27 receives the burden and drops it into a suitable collection bin 28 or other collection means.

An advantage of the inlet chamber as described is that the inlet stream can enter the chamber through an inlet port 29 near the bottom of the module. There it can gradually rise to flow over the edge. This provides the advantages that the inlet piping can be located near to the ground, and that turbulence will be reduced as the stream rises in the inlet chamber. Ribs 30 (see FIG. 5) can be provided which extend horizontally along the inner walls of the inlet chamber. These appear to further reduce the turbulence in the incoming stream.

One or more wands 35, 36 are provided to assist the passage of the burden down the screen. In a practical system, at least two such wands will be provided, although only one, or three or more can be used, depending on the scale of the device.

The wands 35 and 36 are journaled to the end wall by bearings. Bearings 37 and 38 are water transmissive, to give access to the axial passages in the tubular wands. The wands are closed at their ends adjacent to bearings 39 and 40. The wands are identical. Each has a number of nozzle-like perforations 41 which project a stream of water laterally. When they are upwardly directed, they impinge on the bottom of the screen.

It is necessary that these rotate in the same direction so as to assist movement of the burden down the screen. They must be powered and provided with water to provide the jet streams.

A pump 50 draws water from the water collection chamber through pipe 51. The water is pressurized, and part of the output of the pump is returned through pipes 52 to the wands. Thus, filtered water is fed to the pump, and it in turn supplies water to feed the wands.

The pump also supplies, through pipes 53, water under pressure to power a water wheel 55. It is generally more convenient to place the water wheel outside of the structure, mounted to a side wall. The minor disadvantage is that spent water from it requires a conduit to convey it to the other filtered water.

Water wheel 55 includes a drive shaft 56 and a head 57 on the shaft. The head has a plurality of appropriately shaped vanes 58 spaced from the shaft, which successively pass through the path of a water jet 59 discharged from a nozzle 60. Jet 59 exerts a strong torque on the head, and the head will turn at a rapid rate, preferably on the order of about 200 rpm. This, of course, is too fast for the wands to rotate. For this reason a conventional gear reduction 61 is provided. A reduction of about 100:1 is useful to produce power at the output shaft 62, to rotate the wands at about 2 rpm. Other ratios and speeds can be selected, but the principle is the same—a considerable reduction in rotary speed from a water wheel rotated at a much higher speed, all to produce sufficient power reliably to rotate the wands.

The gear reduction may be placed inside or outside of the water collection chamber. Generally it will be placed inside. For transmission of power from output shafts 62 to the wands, a simple mechanical linkage is to be preferred.

In FIG. 4 output shaft 62 carries a pulley 63. Pulleys 64, 65 are fixed to the wands. Drive belts 66, 67 link pulleys 63, 64 and 63, 65. Observe that both wands will rotate in the same sense so as to drive the debris in the same direction.

It will be observed that the water lines in this installation can all be rigid pipe, and that their lengths can be kept to a minimum. The device provides good power, is reliable and rugged in the field.

Modules such as shown in FIG. 1 can be placed side by side so as to share an inlet chamber, instead of lengthening the device to increase capacity. In FIG. 5, two modules 60, 61 are placed side by side, and share a common inlet chamber 62. Water which upwells in chamber 62 flows out over both of the screens. Each module is provided with wand drive and wand supply means as previously described.

This invention is not to be limited by the embodiments shown in the drawings and described in the description, which are given by way of example and not of limitation, but only in accordance with the scope of the accompanying claims.

I claim:

1. A gravity screen filter comprising:

a housing having a bottom, a pair of end walls, and a pair of sidewalls joined to form a water collection chamber having an open top;

a sloping perforated screen extending across the top of said water collection chamber;

inlet means to discharge water to be filtered onto the screen;

outlet means to drain filtered water from the water collection chamber;

a rotary wand beneath the screen in the water collection chamber journaled for rotation to said end walls with an axis of rotation parallel to said screen, said wand being hollow and having a plurality of nozzles directing jets of water radially from the wand to the screen;

a drive nozzle means for causing a jet of water to be jetted therefrom;

a rotary water wheel positioned to be driven by a jet stream of water from said nozzle means;

gear reduction means connected to said water wheel to provide a rotary output slower than that of the water wheel;

transmission means linking the gear reduction means to the wand; and means for connecting said wand to a source of water under pressure.

2. A gravity screen filter according to claim 1 in which a plurality of said wands is provided, in which said gear reduction means includes a rotary output shaft, each wand including a pulley, and transmission means comprising a belt linking each pulley to said output shaft whereby the wands are driven in the same rotary sense by said belts.

3. A gravity screen filter according to claim 1 in which said inlet means comprises a vertically rising chamber adjacent to one of said walls, and discharging water to be filtered onto said screen.

4. A gravity screen filter according to claim 3 in which horizontal ribs are formed in said rising chamber for reducing turbulence therein.

5. A gravity screened filter according to claim 1 in which a pair of said collection chambers are placed side by side, with a vertically rising inlet chamber between them, discharging onto both of said screens.

6. A gravity screen filter according to claim 5 in which horizontal ribs are formed in said rising chamber for reducing turbulence therein.

* * * * *